United States Patent [19]
Sollich

[11] Patent Number: 6,065,395
[45] Date of Patent: May 23, 2000

[54] APPARATUS FOR CONTINUOUSLY TEMPERING CHOCOLATE MASSES AND THE LIKE

[76] Inventor: Thomas Sollich, Albernberg 30, D-32689 Kalletal, Germany

[21] Appl. No.: 09/418,141

[22] Filed: Oct. 14, 1999

[30] Foreign Application Priority Data

Oct. 24, 1998 [DE] Germany ............... 198 49 099

[51] Int. Cl.⁷ ............... A23G 1/00; A23G 1/10; B01F 7/16; B23Q 15/00; A23C 3/04

[52] U.S. Cl. ............... 99/470; 99/348; 99/453; 99/455; 99/483; 99/485; 99/517; 366/149; 366/293; 366/304

[58] Field of Search ............... 99/348, 452–455, 99/458–460, 464, 466, 470, 483, 485, 517, 486; 366/144–149, 293, 304, 309, 315, 312; 426/138, 231, 519, 524, 660; 165/94, 95, 109.1

[56] References Cited

U.S. PATENT DOCUMENTS

| | | | |
|---|---|---|---|
| 4,859,483 | 8/1989 | Sollich | 426/519 |
| 4,892,033 | 1/1990 | Sollich | 99/455 |
| 5,188,853 | 2/1993 | Sollich | 426/231 |
| 5,514,390 | 5/1996 | Aasted | 426/231 |
| 5,850,782 | 12/1998 | Aasted | 99/455 |
| 5,862,745 | 1/1999 | Aasted | 99/470 |
| 5,899,562 | 8/1989 | Aasted | 366/149 |

FOREIGN PATENT DOCUMENTS

| | | |
|---|---|---|
| 0 654 222 B1 | 11/1994 | European Pat. Off. . |
| 40 27 429 C2 | 3/1992 | Germany . |

Primary Examiner—Timothy Simone
Attorney, Agent, or Firm—Thomas, Kayden, Horstemeyer & Risley, L.L.P.

[57] ABSTRACT

An apparatus for continuously tempering chocolate masses and the like includes at least one tempering circuit (17) for a tempering medium and a plurality of chambers (9), at least one of the chambers (9) being connected to the tempering circuit (17). The chamber (9) includes an entrance (15) for the tempering medium being arranged at the periphery of the chamber (9) and an exit (16) for the tempering medium being arranged at the periphery of the chamber (9). At least one first separating wall (29, 29') is arranged inside the chamber (9), and at least one second separating wall (30, 30') is arranged inside the chamber (9). The first and second separating walls (29, 29'; 30, 30') are arranged in the form of at least two spirals defining a spiral-like canal (32) therebetween for the flow of the tempering medium from the entrance (15) toward the exit (16). The separating walls (29, 29'; 30, 30') each extend from an outside region of the chamber (9) toward an inside region of the chamber (9).

24 Claims, 5 Drawing Sheets

APPARATUS FOR CONTINUOUSLY TEMPERING CHOCOLATE MASSES AND THE LIKE

CROSS REFERENCE TO RELATED APPLICATIONS

This application claims the benefit of co-pending German patent application number 198 49 099.2 entitled "Vorrichtung zum kontinuierlichen Temperieren von zu verarbeitenden kakaobutterhaltigen oder ähnlichen fetthaltigen Massen", filed on Oct. 24, 1998.

FIELD OF THE INVENTION

The present invention generally relates to an apparatus for continuously tempering chocolate masses and the like. More particularly, the present invention relates to an apparatus for continuously tempering chocolate masses and the like including at least one tempering circuit for a tempering medium and a plurality of chambers, at least one of the chambers being connected to the tempering circuit.

BACKGROUND OF THE INVENTION

Usually, the chambers are part of a tempering column in which the chambers are arranged above one another. Mass chambers through which the mass to be tempered flows are arranged between the chambers through which the tempering medium flows.

The present invention is especially applicable to the region of one or more cooling chambers through which a cooling medium flows. On the other hand, the present invention may be also used in any other portion of a tempering column, for example in a crystallization zone or a heating zone. Each chamber forms a disc-like hollow body being designed to be closed except an entrance and an exit being connected to a tempering circuit. The chambers include separating walls defining a flowing path, a canal or a channel for the tempering medium.

An apparatus for continuously tempering chocolate masses and the like is known from European Patent No. 0645222 B1. The apparatus includes a plurality of chambers, a tempering medium or a cooling medium flowing through some of these chambers. A mass chamber through which the mass to be tempered is pumped by means of a pump is arranged between two adjacent chambers through which the tempering medium flows. The chamber through which the tempering medium flows includes a plurality of separating walls. The separating walls are either arranged concentrically about the axis of the chamber, or they are arranged radially to the axis of the chamber. The axis of the chamber corresponds to the axis of the tempering column. The chamber further includes an entrance and an exit for the tempering medium. Shortly after the tempering medium enters the chamber through the entrance, there is a first turning point in which the flowing direction of the tempering medium is changed about 180°. A second turning point follows after about 270°. This second turning point also changes the flowing direction about 180°. The tempering medium then flows back clockwise about 270°, and it reaches a third turning point. The second and third turning points already have the consequence of the tempering medium flowing in a radial outside direction. After the third turning point, the tempering medium keeps on flowing in a counter clockwise direction, until it reaches the fourth turning point, it changes its direction about 180°, and it flows in a radial outside direction and further on in a clockwise direction until it exits the chamber through the exit. Consequently, the chamber includes four turning points in which the direction of the tempering medium is changed by 180°. Each of these turning points has the negative effect of a loss of pressure of the tempering medium. Thus, the pump pumping the tempering medium through the chamber has to supply extra pressure. Additionally, the flowing surface substantially changes in the region of the four turning points. It is well known that a change of the flowing surface results in a change of the velocity of the tempering medium at that point, so that changes of the heat being transferred occur. In case of the chamber being a cooling chamber which is connected to a cooling circuit, there will be zones, especially in the region of the turning points and in the region of the entrance and the exits, in which the tempering medium flows at a very low speed. Thus, the temperature of the tempering medium in these regions increases with respect to other regions in which the tempering medium flows at a higher speed. Especially in the precrystallization procedure of chocolate masses in a cooling or crystallization zone, it is desired to keep the temperature of the cooling surfaces within a small range. In case the temperature is too high, no crystals are formed in this region.

Additionally, different temperatures of the cooling surfaces occur in different regions of the chamber. In case of the tempering medium being a cooling medium, the tempering medium has the lowest temperature at the entrance of the chamber. The temperature of the tempering medium increases along the flowing path, so that it reaches its highest temperature at the exit of the chamber. Due to the arrangement of the separating walls of the known chamber, the lowest temperature of the cooling surface is realized in a circle-like region in a radial inside portion of the chamber. Radial outside portions of the chamber have a higher temperature of the cooling surface since this is the region in which the tempering medium returns toward the exit. Consequently, the cooling surfaces facing the mass to be tempered are cooler at a small radius than in the outward portion of the chamber. Thus, the cooling surfaces do not have the same temperature in all regions of the surface of the chamber.

It is known from German Patent No. 40 27 429 C2 that optimum crystals are formed in tempering machines when the temperature of the cooling surfaces facing the mass is kept constant. This means to keep the temperature constant at all locations of the surface of the chamber.

SUMMARY OF THE INVENTION

Briefly described, the present invention provides an apparatus for continuously tempering chocolate masses and the like. More particularly, the present invention relates to an apparatus for continuously tempering chocolate masses and the like including at least one tempering circuit for tempering medium and a plurality of chambers. At least one of the chambers is connected to the tempering circuit, so that the tempering medium may flow through the chamber. Heat is transferred through the surfaces being arranged between the chamber and the mass chamber through which the mass to be tempered flows. The mass to be tempered is either cooled or heated by the tempering medium. Thus, either heat is transferred from the mass to the tempering medium, or from the tempering medium to the mass. The chamber includes an entrance for the tempering medium. The entrance is arranged at the periphery of the chamber, meaning in the radial outside portion of the chamber. The chamber further includes an exit for the tempering medium through which the tempering medium exits the chamber after it has been flowing through the chamber, and after it has either cooled or heated the mass to be tempered. The exit is also arranged at the periphery of the chamber. The chamber further includes at least one first separating wall being arranged inside the chamber and at least one second separating wall also being arranged inside the chamber. The first and second separating walls are arranged to form at least two spirals inside the chamber. By these two spirals, a spiral-like canal or channel is defined between the separating walls. The tempering medium coming from the entrance of the chamber is pumped through the canal and through the inside of the chamber, until it exits the chamber through the exit of the chamber. Due to the spiral-like shape of the separating walls and of the canal, the separating walls extend from an outside region of the chamber toward an inside region of the chamber.

In the simplest form of the chamber, it includes only one first separating wall, only one second separating wall and only one turning point. The turning point is arranged in an inside region of the chamber. The number of turning points is independent of a change of the flowing surface. The novel design of the canal can be easily understood imagining a water hose of which the first end defines the entrance, and of which the second end defines the exit. If one deforms the water hose to have a U-shape, one can see that the hose only includes one turning point in which the flowing direction of water flowing through the hose changes about 180°. If the hose is winded up in the form of a spiral, and if the two contacting walls of the water hose are designated as a separating wall, one can understand the principle arrangement of the simplest embodiment of the present invention including two separating walls in the chamber. It can be understood that a plane of symmetry may be arranged in the region of the one turning point. By this plane of symmetry, it can be understood that the forward portion and the return portion are arranged to be mirror-inverted. Additionally, it can be seen that, due to the spiral design, mirror-inverted sections of the forward portion and of the return portion inside the chamber are located to be adjacent. This means that, for example, the beginning of the forward portion is located adjacent to the end of the return portion. Consequently, the regions of the surface contacting the mass have an average temperature of the lowest temperature and the highest temperature of the cooling medium in this section. The same is true for corresponding other mirror-inverted sections of the forward portion and the return portion. The temperatures of the cooling medium may have a difference of varying amounts. The average value of the temperature is the same in all sections. Consequently, the mass is evenly tempered by the tempering surfaces about the whole surface of the chamber.

The design and arrangement of the canal or the channel being defined by the separating walls in the chamber provides another advantage. It is known that, during crystals being formed in the precrystallization of a tempering machine, a critical cooling average temperature exists, meaning a temperature at which crystals are still formed. If this temperature is exceeded in portions, no crystals are formed in these portions. With a chamber as it is known from the prior art, this problem can be only prevented by keeping the highest temperature at the end of the return portion below this critical temperature. This also means that the cooling medium at the entrance of the chamber has to have a very low temperature. In the prior art, the tempering medium enters the chamber at a temperature of approximately 18° C. or less. The novel apparatus according to the invention uses a tempering medium entering the chamber at a temperature of up to 22° C. This is possible since the temperature of the cooling surfaces facing the mass is constant about the surface and about the radius of the chamber. Thus, the entering temperature of the cooling medium may be about 5 to 6° C. less than it is known in the prior art. In this way, and due to a more effective use of the cooling surface at a constant temperature, the apparatus is usable with great safety in all operation modes of the apparatus. For example, this is also true for a partial load operation mode of the apparatus. Such a partial load occurs, for example, when an apparatus being calculated and having the dimension to work with the maximum mass flow is operated at a reduced mass flow. This may be the case because the product to be covered by chocolate requires a reduced mass flow. The novel design of the chamber and of the canal makes the apparatus more reliable with respect to a tempering machine operating at a partial load.

The sections of the canal forming the forward portion on the one hand, and the return portion on the other hand, preferably have approximately the same length. In such an embodiment, the entrance and the exit are located close to one another. There are no regions in the flow where the tempering medium does not flow at all or only flows at a low velocity.

The separating walls extending in the form of a spiral may have an approximately constant flowing surface for the tempering medium at all locations of the forward portion and of the return portion. The flowing surface extending perpendicularly to the canal may be constant along its entire length including the forward portion and the return portion. The canal may be arranged such that the separating walls are equally spaced apart. The only exception to this arrangement is the entrance and the exit. The velocity of the tempering medium approximately has the same value at all locations of the canal, so that a turbulent flow may be easily realized at all locations of the surface of the chamber. On the other hand, it is also possible to chose the design of the canal to have flowing surfaces of varying sizes in different sections of the canal. Such an arrangement may be desirable to compensate varying velocities of the mass moving through the mass chamber.

The simplest embodiment of the present invention provides a mass chamber only including two separate separating walls. In this arrangement, only one turning point is necessary. In case it is desired to minimize the number of turning points, this embodiment is preferred. The loss of pressure is minimized. The surface contacting the mass is used at 100%, and differently tempered portions of the surface are prevented.

Nevertheless, it is also possible with the present invention to have a chamber including four separate separating walls and two turning points. In this arrangement, a first forward portion is connected to a first return portion, the first return portion being connected to a second forward portion, and the second forward portion being connected to a second return portion. It is preferred that each of the four portions approximately has ¼ of the entire length of the canal. The first return portion may be connected to the second forward portion inside the chamber, so that only one entrance and one exit are arranged at the outside of the chamber. Nevertheless, it is also possible to connect the first return portion to the second forward portion outside of the chamber, or to divide the tempering medium to flow into the two forward portions, and to collect all tempering medium at the end of the two return portions. Thus, this arrangement only provides two turning points being arranged inside the chamber.

There is a number of different possible designs of the separating walls inside the chamber. Usually, the separating wall extends perpendicularly to the disc-like chamber. The separating wall is constantly connected to one of the walls of the chamber, and it is closely arranged to the other wall of the chamber. The separating wall itself may have a round or a polygon-like design. The separating wall may be arranged such that the curvature of the forward portion and the curvature of the return portion substantially remain constant, and they are only changed in the region of the entrance and of the exit.

It is preferred that the entrance and the exit of the chamber are located to be adjacent. Such an arrangement facilitates a connection of the entrance and the exit to the tempering circuit outside the chamber. This is especially true in case the tempering medium flows through a plurality of chambers being arranged one above the other.

Other objects, features and advantages of the present invention will become apparent to one with skill in the art upon examination of the following drawings and the detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
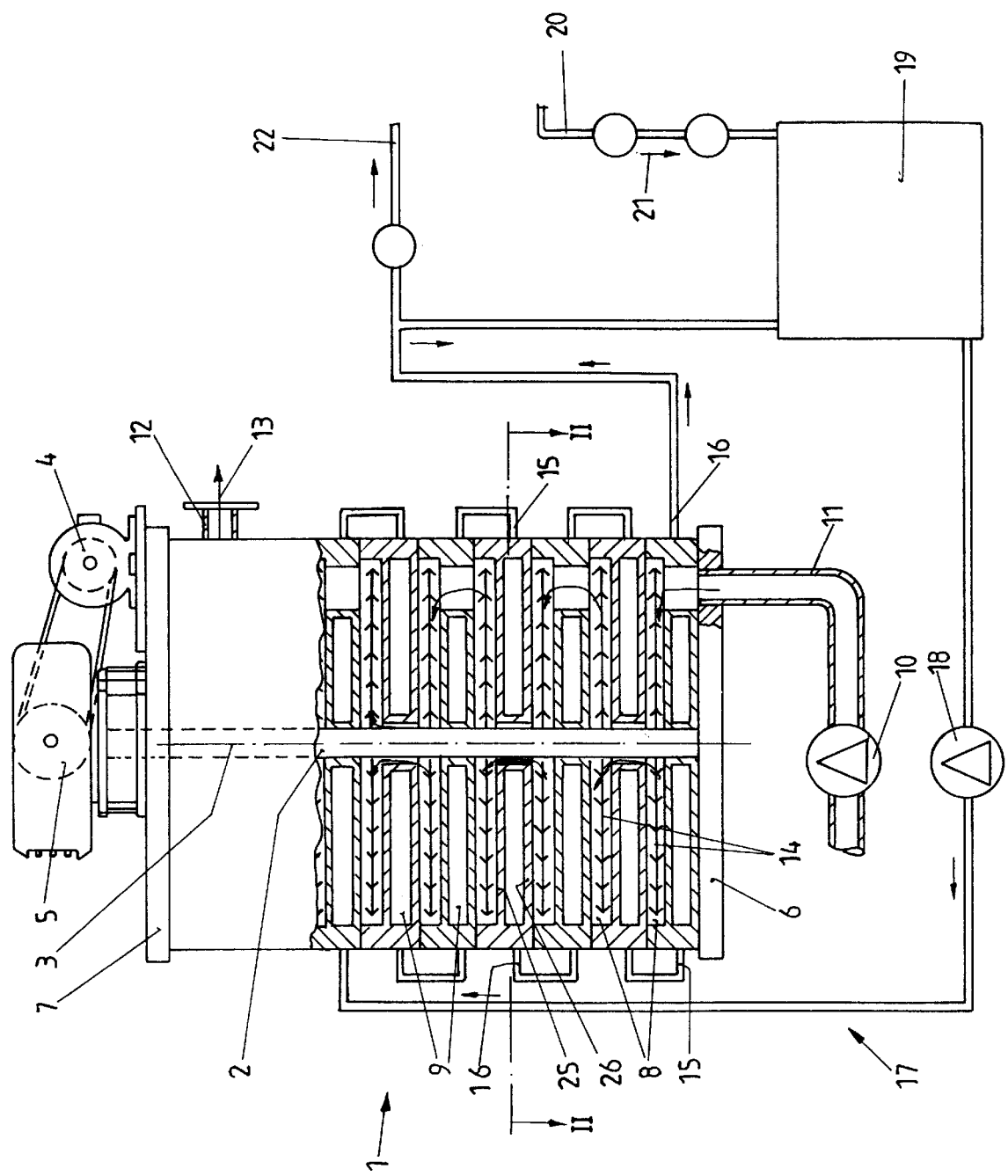
FIG. 1 illustrates an exemplary embodiment of a tempering column.

Referring now in greater detail to the drawings, FIG. 1 schematically illustrates a tempering column 1 having a substantially cylindrical shape. The tempering column 1 includes a plurality of separate discs. A driving shaft 2 having a vertical axis 3 extends through the discs. The driving shaft 2 is driven by a motor 4 and a transmission 5. Mass chambers 8 through which the mass to be tempered flows and chambers 9 through which a tempering medium flows are alternatingly arranged between a bottom plate 6 and a top plate 7. The mass to be tempered may be a chocolate mass, a white chocolate, a mass containing cacao butter or another fat containing mass. The mass to be tempered enters the lowest mass chamber 8 through a conduit 11 by means of a pump 10. Inside the lowest mass chamber 8, the mass substantially flows from the outside to the inside of the mass chamber 8, and it enters the above arranged adjacent mass chamber 8 through a passage being arranged radially inside. The mass chambers 8 include passages for the mass which are alternatingly arranged at the outside portion, and at the inside portion close to the driving shaft 2. In this way, the mass passes through the tempering column 1 in an upward direction. The mass flows through a majority of mass chambers 8, and it finally exits the tempering column 1 through the mass exit 12 according to arrow 13. Mixing tools 14 may be arranged inside the mass chambers 8, the mixing tools 14 only being schematically illustrated.

Each chamber 9 through which a tempering medium flows includes an entrance 15 and an exit 16 being schematically illustrated in FIG. 1. Usually, the entrance 15 and the exit 16 are arranged at each chamber 9 in an adjacent manner to simplify the connection of chambers 9 by conduits. A circuit 17 is connected to the chambers 9 by the entrances 15 and the exits 16. The circuit 17 is driven by a pump 18, and it pumps a tempering medium from a mixing container 19 through the chambers 9. Usually, the tempering medium is water, although other liquid mediums may be used. The tempering medium flows through the chambers 9 in an opposite direction to the flowing direction of the mass flowing through the mass chambers 8. The tempering medium flows from the lower portion of the tempering column 1 in an upward direction. Tempering medium is supplied to the mixing container 19 by a conduit 20 in the direction of arrow 21. Valves are arranged in the conduit 20. Surplus tempering medium exits the circuit 17 through a conduit 22. FIG. 1 only illustrates one circuit 17 although it is also possible to utilize a plurality of circuits 17 to realize a plurality of different zones inside the tempering column 1, and to connect each of the zones to a separate circuit 17. Each zone may include one or more chambers 9. For example, it is known to utilize a cooling zone in the lower portion of the tempering column 1, a crystallization zone in the middle portion and a reheat zone in the upper portion. Such an arrangement is used to temper chocolates. In this case, three differently tempered circuits for a tempering medium are arranged. These three circuits may have the same design as the illustrated circuit 17.

Figure 2:
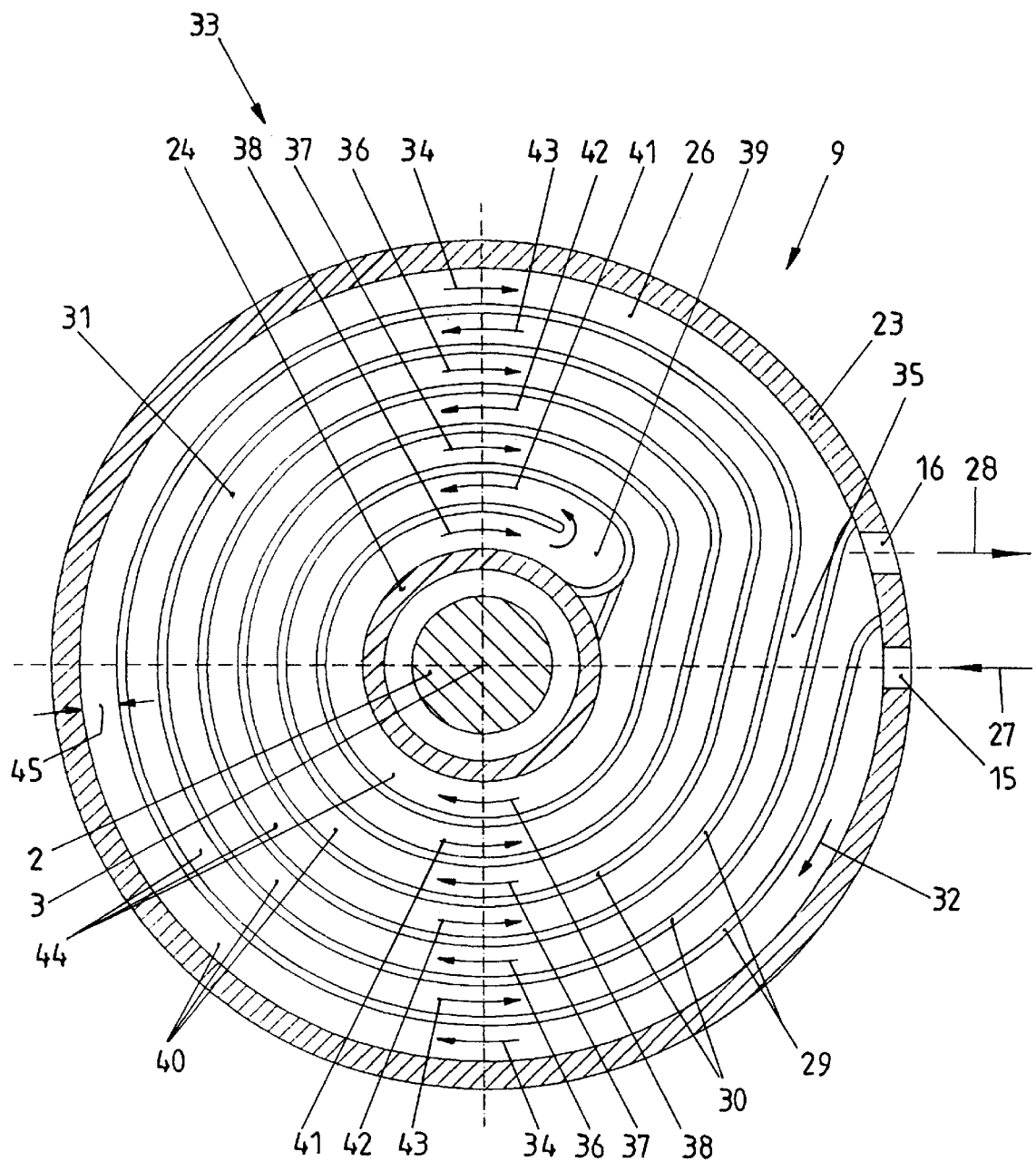
FIG. 2 illustrates a sectional view along line II—II through a first embodiment of a chamber.

FIG. 2 illustrates a sectional view along line II—II in FIG. 1, meaning a top view on the chamber 9 through which a tempering medium of the circuit 17 flows. The chamber 9 includes an outer wall 23 and an inner wall 24. The chamber 9 is closed by two walls 25 and 26 (FIG. 1). The heat transfer to the mass takes place through the walls 25 and 26. The entrance 15 and the exit 16 are arranged in the outer wall 23. The tempering medium of the circuit 17 flows into the chamber 9 according to arrow 27. The tempering medium exits the inside of the chamber 9 through the exit 16 according to arrow 28. In case the chamber 9 is a cooling chamber, meaning a chamber with which the mass is to be cooled, the tempering medium of the circuit 17 has a comparatively low temperature at the entrance 15. The tempering medium will heat up due to the heat coming from the mass through the walls 25 and 26, so that it will exit the chamber 9 through the exit 16 at a comparatively increased temperature. The opposite is true in case of a chamber 9 being arranged in a reheat zone. In this case, heat is transferred from the tempering medium to the mass, so that the temperature of the tempering medium is decreased while it flows through the chamber 9.

The chamber 9 being limited by the walls 25 and 26 and the walls 23 and 24 also includes two separating walls 29 and 30. The separating walls 29 and 30 extend along the height of the chamber 9 (FIG. 1). The two separating walls 29 and 30 are arranged in the form of two spaced apart spirals. The distance between the two spirals is substantially constant, and the two spirals extend along the entire surface 31 of the chamber 9. Thereby, a channel or a canal 32 is defined between the two separating walls 29 and 33, and in combination with the outer wall 23 and the inner wall 24, respectively. With this arrangement, the tempering medium is guided over the entire surface 31 of the chamber 9. The separating walls 29 and 30 define two spaced apart spirals or, in other words, one single spiral 33 including two paths. The tempering medium entering through the entrance 15 flows clockwise according to arrow 34 at a relatively great radius or diameter, respectively, about approximately 360° concentrically about the axis 3. Then, it enters a region 35 in which it is directed in an inward direction toward a smaller radius to flow about this smaller radius about 360°, again. This is repeated twice according to arrows 37 and 38 until the tempering medium finally reaches a turning point 39 at which the tempering medium and the canal 32, respectively, changes its direction about 180°. This portion of the canal 32 extending from the outside to the inside in a radial direction according to arrows 34, 36, 37 and 38 to the turning point 39 is designated as forward portion 40. The canal 32 and the tempering medium flowing through the canal 32 extend in a counter clockwise direction between the turning point 39 and the exit 16. The direction of the canal 32 is indicated by arrows 41, 42 and 43. This portion of the canal 32 being directed in a counter clockwise direction from the inside to the outside is designated as return portion 44.

The separating walls 29 and 30 are arranged about the radius of the surface 31 at a constant distance with respect to one another, so that the channel or canal 32 at each point has a flowing surface 45 of the same size. This design and arrangement results in the tempering medium flowing at the same velocity through all locations of the canal 32. There are only minor changes of velocity in the region 35. The design and the arrangement of the separating walls 29 and 30 in this region achieve substantially constant properties with respect to the flowing surface 45 along the entire canal 32.

This special design and arrangement of the chamber 9 and of the separating walls 29 and 30 in the form of a spiral 33 including two spirals has the goal to attain approximately the same temperature at all points and locations of the walls 25 and 26, that means at all locations of the surface 31 of the chamber 9. Thus, the mass is cooled or heated most effectively, and regions being too cold or too warm are prevented. Such an effect is especially desirable to keep the temperature of the cooling surfaces constant in a precrystallization zone of the tempering column 1. The number and the modification of crystals being formed in such a precrystallization zone strongly depends on whether or not the temperature of the surfaces of the walls 25 and 26 facing the mass is kept constant at all locations about the surface 31 and the radius, respectively. The illustrated design and arrangement of the canal 32 results in this positive and desired effect. For example, if one takes a closer look at the location being designated by the arrows 34 and 43, one can see that, in case of the chamber 7 being used in a cooling zone or in a crystallization zone, the cooling medium according to arrow 34 still has a relatively low temperature since it enters through the entrance 15 at the lowest temperature, and it only heats up along a flowing path of 90°. Adjacent to the arrow 34, the cooling medium flows through the return portion 44 according to arrow 43. At this point, i.e. at the end of the return portion 44, the cooling medium has already collected a lot of heat. The temperature of the cooling medium is only a little less than the temperature of the cooling medium at the exit 16. Consequently, the temperature of the cooling medium at the location of the arrow 34 and at the location of the arrow 43 substantially differs. An average temperature results from these two temperatures at the cooling wall 25 and at the cooling wall 26, respectively. This temperature is called the average or the mean temperature. Heat is transferred to the cooling medium from the mass and the cooling walls 25 and 26.

The same process takes place at all locations at the surface 31. For example, if one takes a look at a location being arranged radially further inside, for example, at a location where the canal 32 is designated by the arrows 38 and 41, a local temperature difference of the tempering medium at the location of the arrow 38 with respect to the location of the arrow 41 occurs. There also is an average temperature in the region of the mass of the cooling walls 25 and 26, respectively. This temperature substantially is the same temperature as the before mentioned average temperature, as it has been described with respect to the regions of the arrows 34 and 43. Generally, it can be stated that adjacent portions of the canal 32 even out the temperature at the cooling walls 25 and 26, respectively, so that one and the same average temperature is attained at all portions at the radius and at the surface 31.

Figure 3:
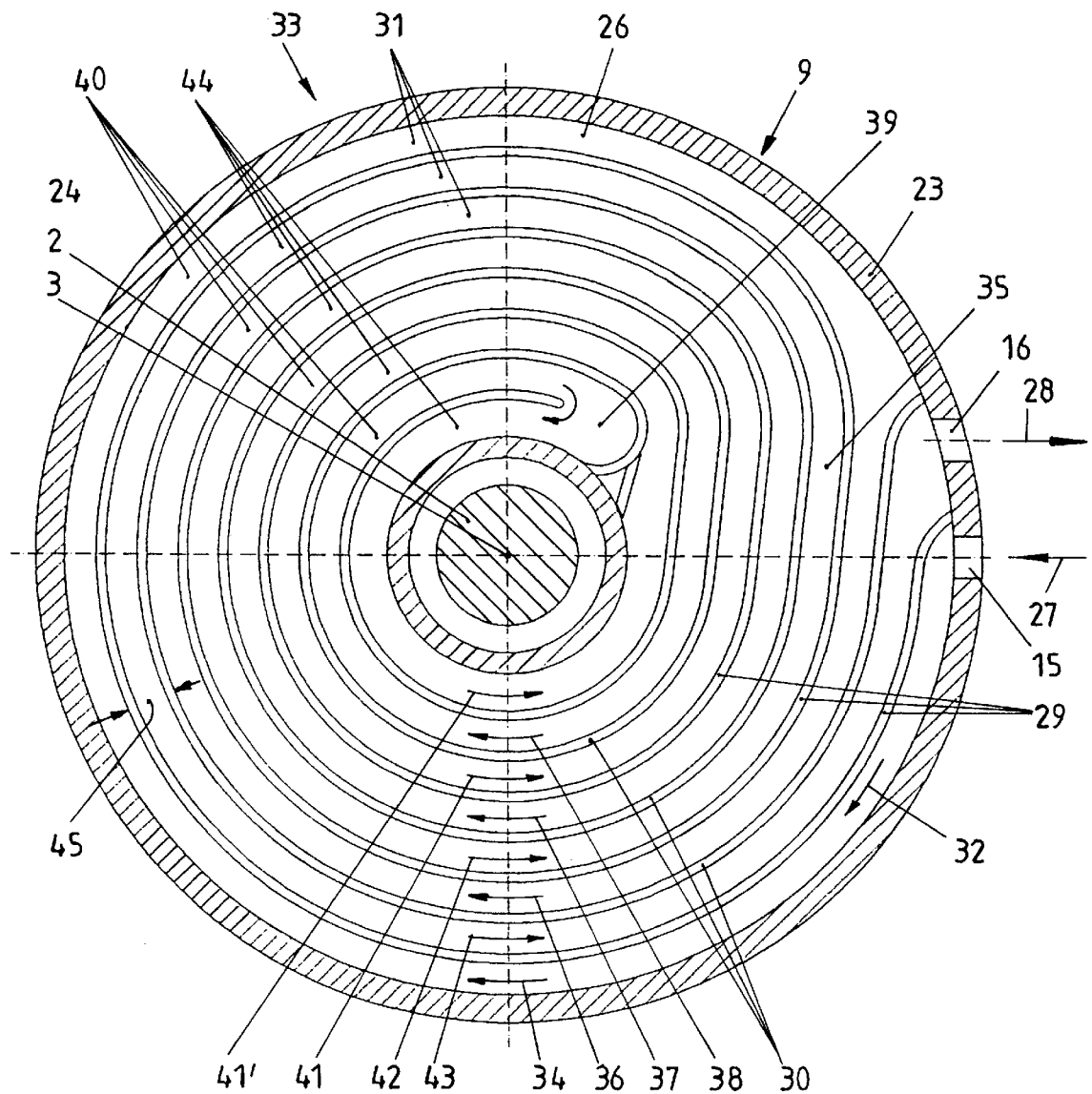
FIG. 3 illustrates a second embodiment of a chamber.

FIG. 3 illustrates a second embodiment of the chamber 9 being similar to the embodiment of FIG. 2. Some features of the chamber 9 have been already described with respect to FIG. 2, so that it is not necessary to repeat these descriptions with respect to FIG. 3. Contrary to the embodiment of FIG. 2, the forward portion 40 and the return portion 44 have approximately the same length. It is easier to understand the design of the canal 32 thinking of the example of a water hose. The two ends of the hose represent the entrance 16 and the exit 17. The hose is arranged in a U-shape so that its two legs are arranged side by side, and so that the turning point 39 is arranged at the other end of the adjacent entrance 15 and the exit 16. The U-shape hose is then winded about the axis 3, so that a similar design to the design illustrated in FIG. 3 is attained. The forward portion 40 corresponds to the length of one of the legs. The return portion 44 corresponds to the length of the other leg. Thus, the forward portion 40 and the return portion 44 have the same length (FIG. 3). Contrary, the forward portion 40 in FIG. 2 is designed to be a little bit longer than the return portion 44 since the canal 32 includes an uneven number of arch-shaped portions. The embodiment illustrated in FIG. 2 includes an even number of arch-shaped portions. The additional portion is indicated by arrow 41'.

Figure 4:
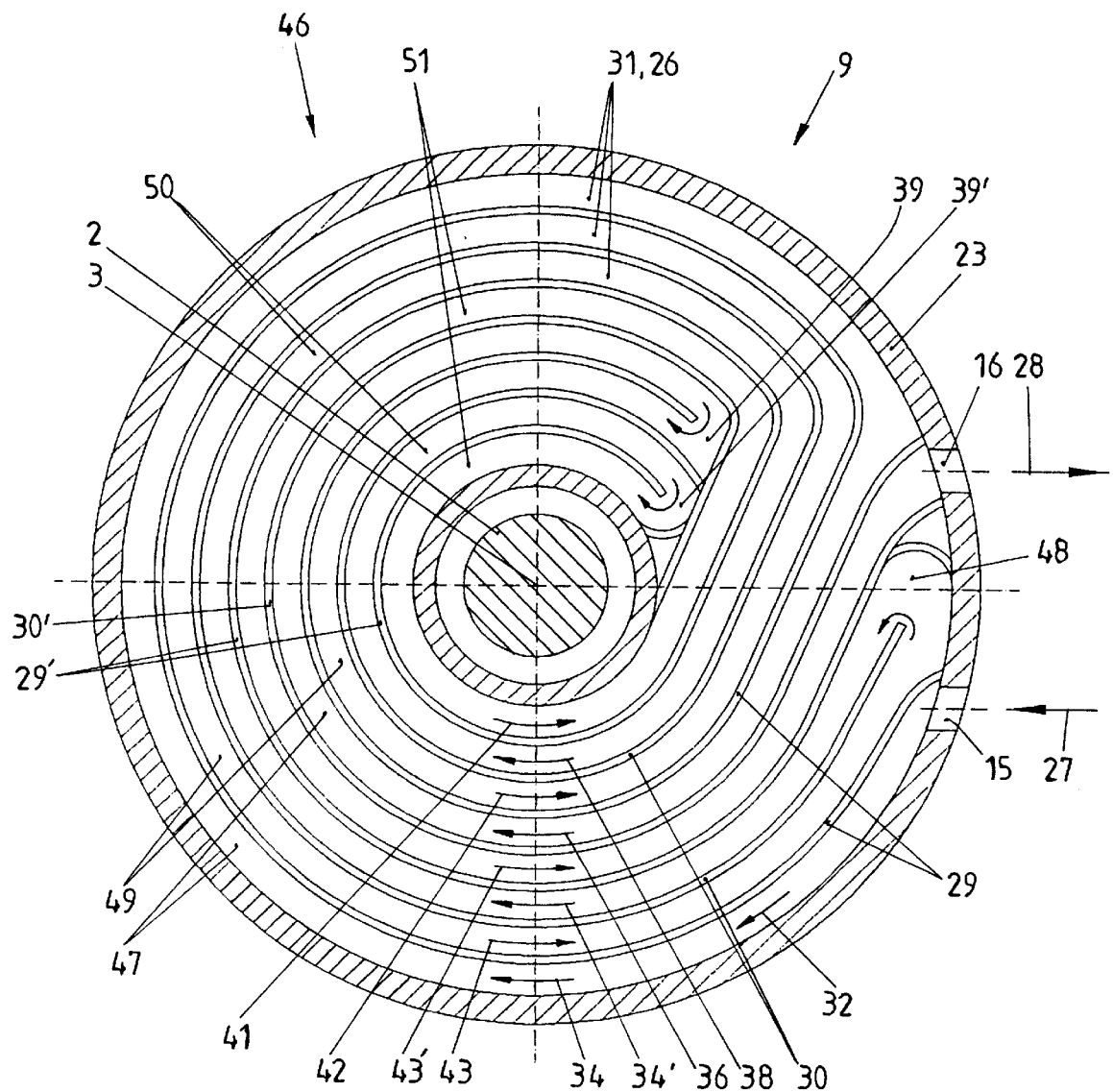
FIG. 4 illustrates a third embodiment of a chamber.

The embodiment of the chamber 9 according to FIG. 4 is a double spiral 46 including four walls 29, 30, 29', 30'. The arrangement can be better understood by thinking of two U-shaped adjacent water hoses being winded about one common axis 3. In the embodiment of FIG. 4, the tempering medium enters through the entrance 15, and it follows the canal 32 according to arrow 34 about approximately 360°. Then, the tempering medium flows in an inward direction to a smaller radius, and it keeps on flowing at that smaller radius for about less than 360° until it reaches the first turning point 39. The described portion or path forms a first portion 47 of the forward portion 40. From the turning point 39, the tempering medium flows on according to the arrows 42 and 43 until it reaches a turning point 48 being arranged at the outer radius. At this turning point 48, the tempering medium changes its direction about 180°. This portion of the canal 32 between the turning points 39 and 48 is designated as first portion 49 of the return portion 44. The turning point 48 is arranged inside the disc-like body, meaning inside the outer wall 23. It is understood that the turning point 48 may also be arranged outside the outer wall 23.

Figure 5:
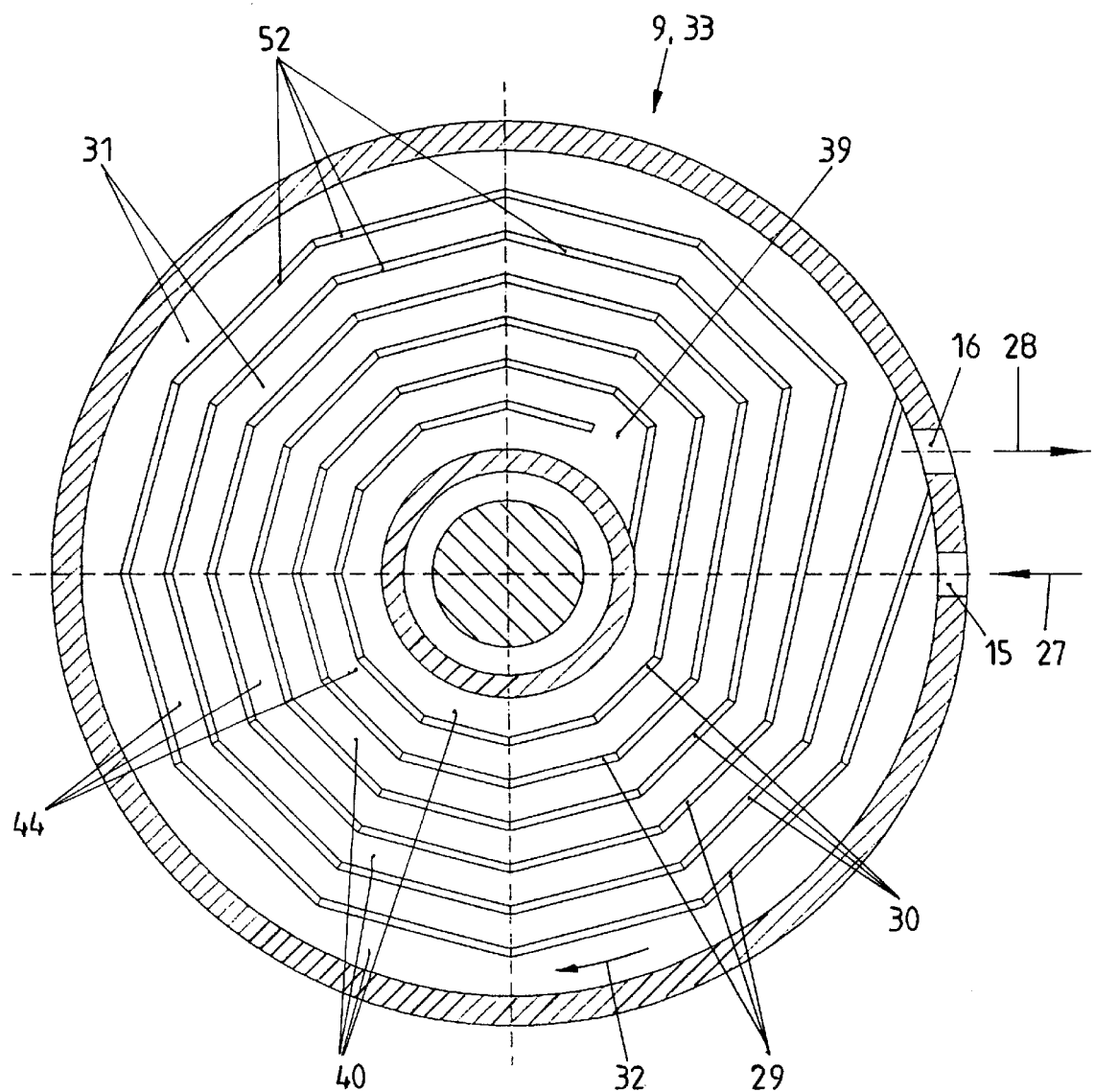
FIG. 5 illustrates another embodiment of a chamber.

Starting from the turning point 48, the canal 32 follows the arrow 34' and then the arrow 38 until it reaches a turning point 39' being arranged radially inside of and adjacent to the turning point 39. This portion of the canal 32 between the turning point 48 and the turning point 39' is designated as second portion 50 of the forward portion 40. The illustrated design of the forward portion 40 includes two portions 47 and 50. Finally, a second portion 51 extends between the turning point 39 and the exit 16 according to arrows 41 and 43'. The second portion 51 is part of the return portion 44 since the tempering medium flows radially in an outside direction. The above described average temperature is also attained in this embodiment at all locations of the surface 31 of the chamber 9 and the cooling walls 25 and 26, respectively. The separating walls 29 and 30 according to the embodiments of FIGS. 2 and 3, and the separating walls 29, 29', 30, 30' according to FIG. 4 have a substantially round shape. The separating walls 29 and 30 of the chamber 9 as illustrated in FIG. 5 include wall portions 52 in the form of straight lines. The entire separating walls 29 and 30 consist of a plurality of these wall portions 52 being connected in the form of a polygon. Except this difference, the embodiment as illustrated in FIG. 5 corresponds to the embodiment as illustrated in FIG. 2. It is also true for this embodiment that the same average temperature is attained at all locations of the radius and the circumference of the surface 31 of the chamber 9.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for continuously tempering chocolate masses, comprising:
   at least one tempering circuit for a tempering medium; and
   a plurality of chambers, at least one of said chambers being connected to said tempering circuit, said chamber including:
      an entrance for the tempering medium being arranged at the periphery of said chamber,
      an exit for the tempering medium being arranged at the periphery of said chamber,
      at least one first separating wall being arranged inside said chamber, and
      at least one second separating wall being arranged inside said chamber, said first and second separating walls being arranged in the form of at least two spirals defining a spiral-like canal therebetween for the flow of the tempering medium from said entrance toward said exit, said separating walls each extending from an outside region of said chamber toward an inside region of said chamber.

2. The apparatus of claim 1, wherein said canal includes a forward portion and a return portion, the tempering medium flowing through said forward portion in a first sense of rotation and in an inward direction of said chamber, and said tempering medium flowing through said return portion in a second sense of rotation and in an outward direction of said chamber.

3. The apparatus of claim 2, wherein said forward portion and said return portion of said canal approximately have the same length.

4. The apparatus of claim 3, wherein the distance of a first location on one side of one separating wall in said forward portion of said canal to said entrance, and the distance of an adjacent second location on the other side of said separating wall in said return portion of said canal are approximately equal.

5. The apparatus of claim 1, wherein said canal defines a flowing surface for the tempering medium, the flowing surface being approximately constant between said entrance and said exit.

6. The apparatus of claim 1, wherein said canal includes only one turning point in which the sense of rotation of the tempering medium flowing through said canal changes to the other sense of rotation, the turning point being arranged in the inside portion of said chamber.

7. The apparatus of claim 1, wherein two first separating walls and two second separating walls are arranged inside said chamber.

8. The apparatus of claim 7, wherein said canal includes only two turning points in which the sense of rotation of the tempering medium flowing through said canal changes to the other sense of rotation, the turning point being arranged in the inside portion of said chamber.

9. The apparatus of claim 1, wherein said separating walls have a round-like shape.

10. The apparatus of claim 1, wherein said separating walls have a polygon-like shape.

11. The apparatus of claim 1, wherein said entrance and said exit are arranged close to one another.

12. An apparatus for continuously tempering chocolate masses, comprising:
    at least one tempering circuit for a tempering medium; and
    a plurality of chambers, at least one of said chambers being connected to said tempering circuit, said chamber including:
       an entrance for the tempering medium being arranged at the periphery of said chamber,
       an exit for the tempering medium being arranged at the periphery of said chamber,
       at least one first spiral-like separating wall being arranged inside said chamber,
       at least one second spiral-like separating wall being arranged inside said chamber, and
       a spiral-like canal for the flow of the tempering medium from said entrance toward said exit, said canal being located between said first and second separating walls and extending from said entrance and an outside region of said chamber toward an inside region of said chamber and back toward the outside region of said chamber and said exit.

13. The apparatus of claim 12, wherein said canal includes a forward portion and a return portion, the tempering medium flowing through said forward portion in a first sense of rotation and in an inward direction of said chamber, and said tempering medium flowing through said return portion in a second sense of rotation and in an outward direction of said chamber.

14. The apparatus of claim 13, wherein said forward portion and said return portion of said canal approximately have the same length.

15. The apparatus of claim 14, wherein the distance of a first location on one side of one separating wall in said forward portion of said canal to said entrance, and the distance of an adjacent second location on the other side of said separating wall in said return portion of said canal are approximately equal.

16. The apparatus of claim 12, wherein said canal defines a flowing surface for the tempering medium, the flowing surface being approximately constant between said entrance and said exit.

17. The apparatus of claim 12, wherein said canal includes only one turning point in which the sense of rotation of the tempering medium flowing through said canal changes to the other sense of rotation, the turning point being arranged in the inside portion of said chamber.

18. The apparatus of claim 12, wherein two first separating walls and two second separating walls are arranged inside said chamber.

19. The apparatus of claim 18, wherein said canal includes only two turning points in which the sense of rotation of the tempering medium flowing through said canal changes to the other sense of rotation, the turning point being arranged in the inside portion of said chamber.

20. The apparatus of claim 12, wherein said separating walls have a round-like shape.

21. The apparatus of claim 12, wherein said separating walls have a polygon-like shape.

22. The apparatus of claim 12, wherein said entrance and said exit are arranged close to one another.

23. The apparatus of claim 12, wherein said chambers are part of a tempering column.

24. The apparatus of claim 1, wherein said chambers are part of a tempering column.

* * * * *